United States Patent [19]

Nakamura et al.

[11] Patent Number: 5,451,306
[45] Date of Patent: Sep. 19, 1995

[54] METHOD OF FORMING FILM ON ELECTRONIC PART METAL SURFACE HAVING BURRS

[75] Inventors: Kazuya Nakamura, Kadoma; Shigenori Uda, Osaka; Tsuguo Inazawa, Yonago; Masaru Kikuya, Osakasayama, all of Japan

[73] Assignee: Matsushita Electric Industrial Co., Ltd, Osaka, Japan

[21] Appl. No.: 214,182

[22] Filed: Mar. 16, 1994

[30] Foreign Application Priority Data

Mar. 16, 1993 [JP] Japan ................................ 5-054456

[51] Int. Cl.⁶ ........................................... C25D 13/12
[52] U.S. Cl. ................................. 204/181.7; 523/404
[58] Field of Search ................. 204/181.7, 180.2; 523/404

[56] References Cited

U.S. PATENT DOCUMENTS

| 4,259,163 | 3/1981 | Suzuki et al. | 204/181.7 |
| 5,183,836 | 2/1993 | Kishi et al. | 204/181.7 |

FOREIGN PATENT DOCUMENTS 5-56098  3/1988  Japan .
2-303574 12/1990  Japan .

*Primary Examiner*—John Niebling
*Assistant Examiner*—Kishor Mayekar
*Attorney, Agent, or Firm*—Wenderoth, Lind & Ponack

[57] ABSTRACT

The present invention relates to a film forming method, in which a specified electrodeposition paint composed of at least an emulsion, a gel fine particle dispersion, and a pigment paste is applied by an electrodeposition coating method to an electronic part metal surface having a burr, followed by drying and baking to form an insulating film having an average thickness of 20 to 100 μm.

5 Claims, 6 Drawing Sheets

METHOD OF FORMING FILM ON ELECTRONIC PART METAL SURFACE HAVING BURRS

BACKGROUND OF THE INVENTION

1. Field of the Invention

The present invention relates to a method of forming a film on an electronic part metal surface having burrs and, more particularly, to a method of forming an insulating film on the surface of an electronic part having a configuration such that a metal portion having burrs of the electronic part has slot portions in which windings are to be disposed.

2. Description of the Prior Art

Electronic parts having a structure such that windings are to be disposed in slot portions of a metal portion of the part, including, for example, a rotor core for a motor, are generally given an insulation treatment between each of the windings and the metal portion in order to avoid electrical shortcircuiting between the windings and the metal portion.

The configuration of the rotor core for motor is schematically shown, in top plan view, by way of example in FIG. 1. The rotor core shown in FIG. 1 has three slot portions, but the number of slot portions is not limited to three. Of course, rotor cores having four or more slot portions exist and there are also known rotor cores of various different configurations. Depending upon the size of the motor, though, thin rotor core sheets of the configuration shown in FIG. 1 are superposed in plural layers to form a rotor core, each rotor core sheet having, for example, a thickness of about 0.35 mm and a diameter of about 40 mm. Each slot portion 6 is provided with a conductor winding. The rotor core 2 is rotatable around a rotary shaft 1 in the direction of the arrow e.

FIG. 2 shows a schematic section taken along line d—d' with respect to a slot portion 6 of the rotor core 2 in FIG. 1. A plurality of thin rotor core sheets 2' are placed one over another with an insulating film 8 formed therearound. A winding (not shown) is placed around the insulating film. In case that a blanking burr 3 is exposed, the tip of the blanking burr 3 may damage a film for the winding, thus causing a short circuit between the winding and the rotor core 2. To avoid such shortcircuiting, the surface of the rotor core 2 is fit with fabrications as an insulating film 8 made of a thermoplastic resin, such as PBT, PET, PPS, or PA.

Such an insulating film is formed by applying a coating on the electronic part surface by powder coating, electrodeposition coating, or otherwise, followed by baking, whichever coating method may be employed, however, painting and baking, when carried out by using a conventional paint as in the past, will result in a lack of hiding 10 in FIG. 3(a) at the tip of a post-baking blanking burr 3 that is attributable to the surface tension of the coating. As a result, the tip of the blanking burr 3 is exposed, so that the required insulation between the winding and the rotor core for motor cannot be attained.

In order to prevent such blanking burr tip exposure and also to prevent a winding—rotor core shortcircuiting due to conductor biting into the insulating film due to coil winding, it is necessary to provide a comparatively thick film of the order of 100 to 200 μm. Such a thick film brings about such a shortcoming that the proportion of the insulating film to the internal volume of slot portion 6 becomes high. For purposes of weight and thickness reduction and capacity increase with respect to motors, it has been desired that some good reduction is achieved in the thickness of the insulating film provided between the winding and the rotor core 2.

Further, blasting for deburring not only involves a cost disadvantage, but also it causes a change in the magnetic characteristics of the core 2 which poses a problem that there will be a 5% or more decrease in torque generation as compared to the case where blasting is not carried out.

SUMMARY OF THE INVENTION

An object of the present invention is to provide a film forming method for use in forming an insulating film between a winding and a metal portion in an electronic part used in a motor or the like for preventing shortcircuiting, which enables a thin insulating film to be formed even on an electronic part metal surface having burrs, without allowing the tip of such a burr to be exposed, the thickness of the insulating film being of the order of not more than 100 μm.

According to the invention there is provided a film forming method comprising:

electrodepositing on an electronic part metal surface having a burr an electrodeposition paint composed of at least:

(A) an emulsion containing 60–80 parts by weight, in terms of solid content, of an amino group-containing polymer which is a reaction product of a bisphenol A residue-containing epoxy resin having a number-average molecular weight of 1,000 to 3,000 and more than one epoxy group per molecule on average or a derivative thereof and a monovalent secondary amine, and 20–40 parts by weight, in terms of solid content, of a blocked isocyanate crosslinking agent, (B) a gel fine particle dispersion containing 20–50 parts by weight, in terms of solid content, of a methylolphenolic compound having a number-average molecular weight of 200–1,000, and 50–80 parts by weight, in terms of solid content, of amine-added polybutadiene resin having a number-average molecular weight of 1,000 to 3,000, and (C) a pigment paste containing 50–70 parts by weight of a pigment in terms of solid content, and 5–15 parts by weight, in terms of solid content, of a resin for dispersing pigment, a content ratio in terms of solid content of (A)/(B)/(C) being 1/0.18–0.72/0-.5–0.9, and baking the resulting electrodeposited film, thereby forming an insulating film having an average thickness of 20 to 100 μm.

DETAILED DESCRIPTION OF THE PRESENT INVENTION

Figure 1:
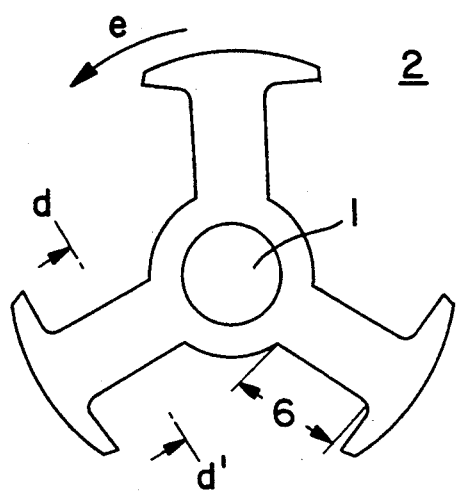
FIG. 1 is a plan view for explaining the concept of a rotor core for motor.

The present invention provides a film forming method comprising:

electrodepositing on an electronic part metal surface having a burr an electrodeposition paint, comprising:

(A) an emulsion containing 60–80 parts by weight, in terms of solid content, of an amino group-containing polymer which is a reaction product of a bisphenol A residue-containing epoxy resin having a number-average molecular weight of 1,000 to 3,000 and more than one epoxy group per molecule on average or a derivative thereof and a monovalent secondary amine, and 20–40 parts by weight, in terms of solid content, of a blocked isocyanate crosslinking agent, (B) a gel fine particle dispersion containing 20–50 parts by weight, in terms of solid content, of a methylolphenolic compound having a number-average molecular weight of 200–1,000, and 50–80 parts by weight, in terms of solid content, of amine-added polybutadiene resin having a number-average molecular weight of 1,000 to 3,000, and (C) a pigment paste containing 50–70 parts by weight of a pigment in terms of solid content, and 5–15 parts by weight, in terms of solid content, of a resin for dispersing pigment, a content ratio in terms of solid content of (A)/(B)/(C) being 1/0.18–0.72/0-.5–0.9, and baking the resulting electrodeposited film, thereby forming an insulating film having an average thickness of 20 to 100 μm.

According to the present invention, it is possible to achieve reduction in the film thickness of an insulator formed between windings and a metal portion in an electronic part having burrs while retaining dielectric strength characteristics. Accordingly, it is possible to realize an increase in the effective area of windings and reduction in the weight, thickness and size of the electronic part.

According to the film forming method of the present invention, a paint is used which comprises at least a mixture of an emulsion, a gel fine particle dispersion, and a pigment paste.

The resin composition of the emulsion used in the electrodeposition paint of the invention comprises a cationic resin and a block isocyanate crosslinking agent.

The cationic resin is an amino group-containing polymer which is a reaction product resulting from a reaction of a monovalent secondary amine with a bisphenol A residue-containing epoxy resin having a number-average molecular weight of 1,000 to 3,000 and more than one epoxy group per molecule on average, and esterified, etherified, and imidized products thereof. A proportion of the cationic resin is 60 to 80 parts by weight based upon 100 parts by weight of the entire resin composition in the emulsion in terms of solid content. If the proportion is less than 60 parts by weight, corrosion resistance is lowered, whereas if it is more than 80 parts by weight, film strength is insufficient.

The blocked isocyanates cross linking agents are prepared by blocking isocyanates with alcohols, oximes, amines, phenols. Examples of the useful isocyanates include aromatic isocyanates, such as 2,4- or 2,6-tolylene diisocyanate, m- or p-phenylene diisocyanate, or aliphatic isocyanates, such as hexamethylene diisocyanate.

Examples of blocking agents for the isocyanates include aliphatic or aromatic monoalcohols, such as methanol, ethanol, butanol, 2-ethylhexanol and benzyl alcohol, oximes, such as methyl ethyl ketone oxime and methyl isobutyl ketone oxime, amines, such as dimethyl amine and dimethyl ethanolamine, phenols, such as phenol and methylphenol.

A proportion of the blocked isocyanate in the emulsion is 20 to 40 parts by weight based upon 100 parts by weight of the entire emulsion in terms of solid content. If the proportion is less than 20 parts by weight, no sufficient hardening can be achieved. If the proportion is more than 40 parts by weight, no sufficient water solubility can be given, which results in reduced paint stability.

The emulsion is prepared by neutralizing predetermined quantities of the cationic resin and the blocked isocyanate in an aqueous medium with an acid to be emulsified.

A resin composition of the gel fine particle solution used in the electrodeposition paint of the present invention comprises a methylolphenolic compound and an amine-added polybutadiene resin.

Examples of methylolphenolic compounds include resol type phenolic resins, such as "Taconol 720721" made by Arakawa Kagaku Kogyo K. K. and "WP551", "WP201" made by Gunei Kagaku Kogyo K. K. Also, phenol ether compounds may be used as such. A proportion of the methylolphenolic compound is 20 to 50 parts by weight based on 100 parts by weight of the entire gel fine particle dispersion in terms of solid content. If the proportion is less than 20 parts by weight, no sufficient coat cure can be obtained, and if the proportion is more than 50 parts by weight, no good corrosion resistance can be obtained.

The amine-added polybutadiene resin is prepared by epoxidizing a polybutadiene resin having a number-average molecular weight of 1,000 to 3,000 and 30 to 100% of 1, 2 bond with peracetic acid, followed by adding amine thereto. Useful examples of such resin are C-1800-6 and -5, made by Nippon Sekiyu Kagaku Kogyo K. K.. A proportion of the amine-added polybutadiene resin is 50 to 80 parts by weight based on 100 parts by weight of the entire gel fine particle dispersion in terms of solid content. If the proportion is less than 50 parts by weight, water solubility insufficiency results in reduced stability of gel particles. If the proportion is more than 80 parts by weight, intraparticle gelation is insufficient, and therefore good edge-covering characteristics can not be achieved.

The gel fine particle dispersion is produced in the form of an emulsion by adding predetermined quantities of the methylolphenolic compound and amine-added polybutadiene resin together to glacial acetic acid to be mixed sufficiently, followed by adding deionized water.

The pigment paste used in the electrodeposition paint of the invention comprises of a resin for dispersing a pigment and a pigment. The resin for dispersing a pigment serves to coat pigment particles and to make the pigment particles cationic. Useful resins for such component include, for example, quaternary ammonium resins.

The pigment is available in the market in a particle size of 20 $\mu$m or less as a coloring pigment, a rust-proof pigment and an extender pigment. The coloring pigment useful in the present invention is, for example, carbon black or titanium dioxide. The rust pigment is exemplified by strontium chromate and basic silicate white lead. The extender pigment is exemplified by aluminum silicate and calcium carbonate.

As to a pigment composition, it is desirable that 10 to 80 parts by weight of the extender pigment is contained on the basis of 100 parts by weight of a total pigment. If the content is less than 10 parts by weight, edge-covering characteristics can not be effected. If the content is more than 80 parts by weight, surface smoothness of film is much lowered. In particular, aluminum silicate having a flat particle shape is effective for improvement of edge-covering characteristics because it controls a viscosity of film when melted at baking.

The pigment paste may be prepared, for example, as follows. The pigment and the resin for dispersing a pigment are added to deionized water to be mixed in a dispersing machine for about one hour. Glass beads are added to the resultant mixture and treated in a sand mill to give a dispersion of particle size of 20 $\mu$m or less. The pigment of 50–70 parts by weight is used. If the proportion of the pigment is too low, film hardness can not be given. If the proportion of the pigment is too high, there arises a problem of brittleness. The resin for dispersing a pigment of 5–15 parts by weight is used. If the proportion is lower that 5 parts by weight, the pigment particles can not be coated uniformly with the resin. The higher proportion than 15 parts by weight does not give effects in proportion to the loadings of the resin. Therefore such a large amount of the resin is economically wasteful.

The paint used in electrodeposition according to the invention comprises a mixture of the foregoing emulsion, pigment paste, and gel fine particle dispersion with deionized water. The method of mixing is not particularly limited insofar as it allows individual solutions to be uniformly mixed together. In order to prevent foaming, however, it is desired that the emulsion, pigment paste and gel fine particle dispersion are mixed mildly while deionized water is added thereto.

Mixing proportions of the emulsion, pigment paste, and gel fine particle dispersion are: 50 to 90 parts by weight of pigment paste, and 18 to 72 parts by weight of gel fine particle dispersion on the basis of 100 parts by weight of the emulsion, in terms of solid content. By mixing the components in these proportions is it possible to increase melting viscosity at the baking stage thereby to control paint fluidity, so that considerable improvement can be achieved in edge covering. This effect becomes more pronounced in case that the gel fine particle dispersion is used in the proportional range of 30 to 60 parts by weight. If the proportion of the gel fine particle dispersion is less than 18 parts by weight, edge-covering characteristics are much lowered. If the proportion is more than 72 parts by weight, film-smoothness is much deteriorated, a coil-winding process can not be performed smoothly. The content of the pigment paste is too much, the obtained film becomes fragile, an Erichsen value is lowered, and many voids generate.

By using an electrodeposition paint composition conforming to the foregoing conditions it is possible to provide a paint film 8 with good adhesivity to a coating object on the order of more than 4.0 mm in terms of Erichsen value and, at same time, with sufficient rigidity to withstand high pressure occurring on the tip of a blanking burr 3 during the stage of coil winding. The term "Erichsen value" referred to herein means a value measured according to JIS-K-5,400, 8.2 and is a value suitable for expressing adhesivity of a film to a coating object and flexibility of a film itself.

The paint obtained in the above described manner is used for cation-electrodeposition of electronic parts having burrs. Cation-electrodeposition coating is a coating method which comprises dipping an electronic part or a coating object in an electrodeposition paint, and supplying a DC current between the coating object and a plate placed within a diaphragm chamber in an electrolyte bath, with the coating object defined as cathode (−) and the plate as anode (+), thereby to deposit a film on the charged coating object.

The cation-electrodeposition coating method is not particularly limited and any known method may be applied using the paint obtained as above described. Specific conditions for electrodeposition coating should be suitably determined according to the type, configuration and size of coating object or electronic part, and type of paint used. According to the invention, even if an electrodeposited and baked film has an average thickness of 20 to 100 $\mu$m, particularly 30 to 60 $\mu$m, any film thinning at the burr portion and shortcircuiting between the metal portion and the winding due to such thin film can be effectively prevented.

According to the invention, it is possible to realize film thickness reduction with respect to an insulator provided between the winding and the metal portion in an electronic part while maintaining the dielectric strength characteristics of the part, and thus to achieve effective area enlargement for windings and weight, thickness and size reduction with respect to electronic parts.

If the film thickness is greater than 100 $\mu$m, effective area for windings is much reduced, whereas if it is smaller than 20 $\mu$m, shortcircuiting between the metal portion and the winding cannot be effectively prevented. In the present invention, film thickness refers to an average of thicknesses indicated by character (b) in FIG. 2, and the film thickness of an edge portion at point (a) is not considered therein.

Subsequently, the electrodeposited film is dried and baked. The drying effects to remove a solvent, hydrogen gas and water from the electrodeposited film and to prevent voids and pinholes in the film in the following baking stage. In the drying process, the deposited film is left under a circumstance of about 60° C. to less than a water-boiling point. The period of the drying process is too short, hydrogen gas, a solvent and water can not be removed sufficiently from the film, resulting in voids and pinholes in the film in the following baking process. The longer the period of the drying process is, the more effective the drying process is. However the drying process for a long time is not preferable from the view point of productivity. Therefore the drying time is adopted so that the above problems may not arise. Usually a drying time is set within the range between 1 and 3 minutes.

After drying, the electrodeposited film is baked, with the temperature increasing from the final drying temperature to a specified baking temperature. During the temperature-rising period, the resin component in the emulsion melts, while the resin component in the gel fine particles dispersion does not melt and exists as solid-particles in the film. Therefore even when the resin component of emulsion melts, flow and drop of the melted resin is restrained. In particular, film-thinning of resin at a burr portion of an electronic part can be prevented. The longer temperature-rising time effects to improve edge-covering characteristics. The temperature is increased from the final drying temperature to a specified baking temperature in 10 minutes or less, preferably about 5 minutes from the viewpoint of productivity. It is, however, to be noticed that the edge-covering characteristics are more improved as the temperature-rising time is longer.

The specified baking temperature is kept for a specified time period to bake the emulsion resin. The baking conditions depend on a type of electrodeposition paint, but the baking is carried out usually at 135°–195° C. for about 20 to 40 minutes. An electrodeposited film per se has a certain degree of hardness such that the film is not likely to become deformed through a mere hand touch. The film is further hardened by baking into a film having greater hardness so that its adhesivity to the electronic part or the substrate is further enhanced. When the baking conditions are set milder than those above mentioned, sufficient hardening of the film can not be achieved. When the conditions are set severer than those above mentioned, there arises a problem of embrittlement.

The film forming method of the invention is typically applicable to electronic parts of metal constitution having burrs which are fabricated by blanking. The method may be applicable to any type of parts insofar as the part is of such a constitution that a winding is housed within a slot in a metal portion. In particular, the method is suitable for application with respect to rotor cores or stator cores for motor use or transformer cores.

According to the invention, any blanking burr produced during the fabrication of a metal portion need not be removed by blasting or otherwise. Therefore, defects such as metal part deformations due to blast pressure can be forestalled and thus a novel process which eliminates the necessity of blasting is now realized.

When the present invention is applied to rotor cores for motor use, thickness reduction can be achieved with respect to an insulating film between a winding and a metal portion. Accordingly, the effective area of the winding is increased, and motor weight and size reduction can be achieved.

A coat film which is baked has a rough surface of a 5 to 20 μm orange peeling-like irregularities (as indicated by character c in FIG. 2) which effect to increase coefficient of friction between the winding and metal portion in a coil-winding process, so that slip of the winding is prevented. In this way, the coat film effectively serves as a surface for winding ground.

Figure 2:
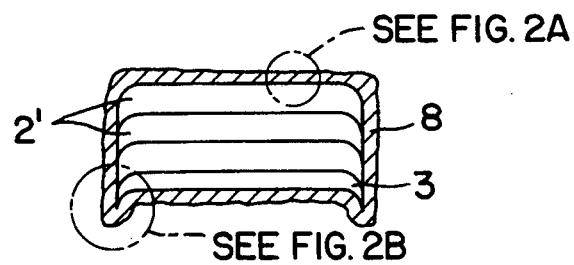
FIG. 2 is a schematic sectional view taken along the line d—d' in the FIG. 1 rotor core which is subjected to a surface insulation treatment in accordance with the invention.
Figure 2A:
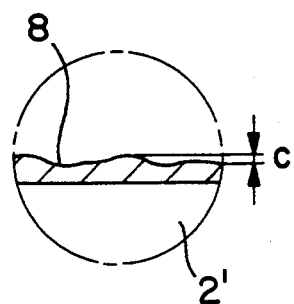
Figure 2B:
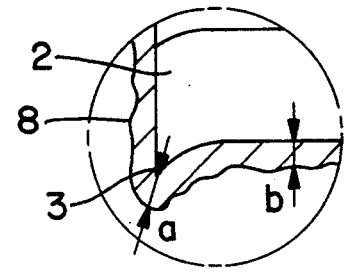
Figure 3A:
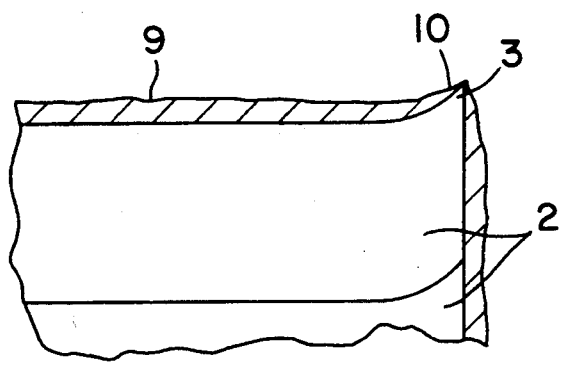
FIG. 3(a) is a schematic fragmentary sectional view of a rotor core (with a burr) which has been subjected to a conventional surface insulating treatment.
Figure 3B:
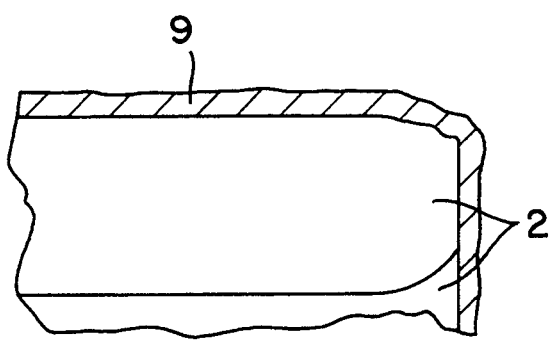
FIG. 3(b) is a schematic fragmentary sectional view of a rotor core (with burr already removed) which is subjected to a conventional surface insulating treatment.

In the invention, any rotor core for motor use, after the process of blanking, is not subjected to any secondary treatment, such as blasting. For the purpose of coating such a rotor core, it is desired that at the tip of a blanking burr 3 in the rotor core 2, the coat film should have an edge covering factor of more than 50%, preferably more than 70%. The term "edge covering factor" herein means a factor expressed by a/b×100, in which characters a and b are shown in FIG. 2. The edge covering factor of 50% is a value which guarantees that where a coat film is formed to a minimum film thickness of 20 μm which is required of a coat film deposited according to the invention, the film has a thickness of 10 μm at the tip of a blanking burr in an electronic part metal portion which meets a minimum dielectric strength requirement of 750 V between a coated conductor wire and the metal portion at the blanking burr tip. The edge covering factor can be improved by decreasing the rate of temperature rise in the vicinity of a film viscosity-lowering point during the stage of baking. The term "film viscosity lowering point" used herein means a temperature at which the resin component in the emulsion begins to melt.

Further, the edge covering factor can be improved by increasing the proportion of a pigment having an unfavorable flow behavior in the pigment composition. The edge covering factor can be also improved by decreasing the proportion of solvent insofar as such decreasing is not detrimental to the performance of the paint.

In accordance with the invention, electrodeposition coating is effected in such a manner that when a conductor wire of $\phi 0.18$ is wound in four layers and under a 150 g tension on an insulation treated rectangular metal pole having a section of 2.25 mm×1.0 mm, an impression caused to the film by the winding will have a depth of not more than 20 μm, preferably not more than 10 μm. Thereby it becomes possible to completely cover any blanking burr 3 produced on the surface of the rotor core 2 during the stage of rotor core 2 fabrication and further to provide a high performance insulating film 8 of a thin, uniform thickness which can withstand high pressure occurring at the tip of the blanking burr 3 during the stage of coil winding. Such impression of 20 μm depth due to coil winding is a threshold film-deformation-value which allows the film to have sufficient hardness to enable coil rewinding without difficulty during the stage of rewinding.

Figure 4A:
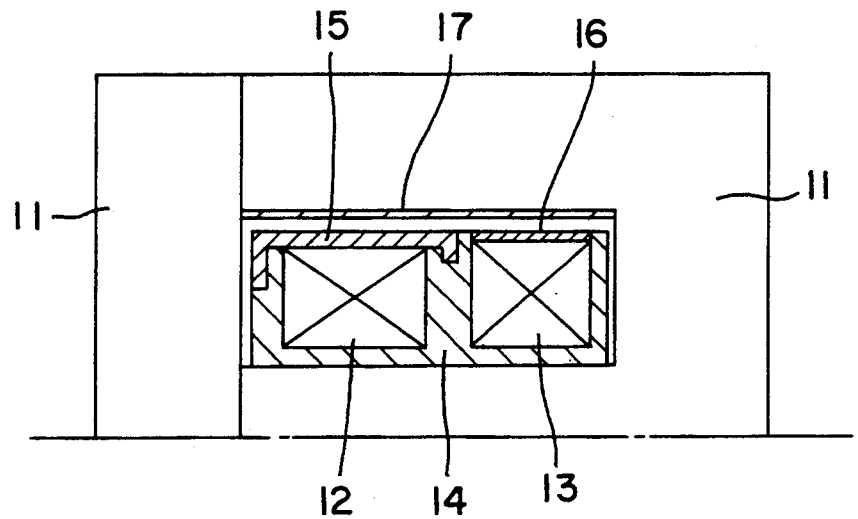
FIG. 4(a) is a sectional view of a transformer core which is subjected to a conventional insulating treatment.

The present invention is applicable to transformer, one of electronic parts for transformation. Conventionally, insulation arrangement for transformers is such that, as shown in FIG. 4 (a), blanking burrs formed in a core 11 are completely covered with an insulating tape 17 and a bobbin 14 fabricated from a thermoplastic resin, such as PET, PBT, and nylon, or a thermosetting resin, such as phenol resin, and a primary winding 12 and a secondary winding 13 are arranged on the bobbin 14, the outer periphery of the windings being covered with an insulating case 15 and an insulating tape 16 to provide insulation between the windings 12, 13 and the core 11. By applying the film forming method of the invention to such a transformer is it possible to achieve thickness reduction with respect to an insulator provided between the primary winding 12 on one hand and the secondary winding 13 and the core on the other hand (according to conventional insulation arrangement, the bobbin film is more than 1 mm thick). It is thus possible to arrange for reduction in weight, thickness and size and performance enhancement with respect to transformers, as well as rotor cores for motor use.

The invention will be further illustrated in detail by using examples.

EXAMPLES

Components of the electrodeposition paint of the invention, namely, pigment paste, emulsion and gel fine particle dispersion, were prepared as described below:

Preparation of Pigment Paste

| | |
|---|---|
| Quaternary ammonium resin varnish | 192 wt parts |
| Carbon black | 9 wt parts |
| Titanium dioxide | 318 wt parts |
| Basic lead silicate | 27 wt parts |
| Kaolin | 101 wt parts |
| Dibutyl tin oxide | 1 wt part |
| Deionized water | 318 wt parts |

("wt part(s)" mean(s) part(s) by weight)

On the basis of the above formulation, deionized water was added to quaternary ammonium resin varnish to dissolve the latter. Then, pigment and dibutyl tin oxide were added and stirring was carried out by a dissolver for one hour. To this mixture were added glass beads, and dispersion was carried out to less than 15 μm. Glass beads were filtered off.

Emulsion (1) Preparation of Aminated Epoxy Resin

One thousand parts by weight of diglycidyl ether of bisphenol A (epoxy equivalent 910 were dissolved in 463 parts by weight of ethylene glycol monoethyl ether while being kept at 70° C. under stirring. Diethyl amine (80.3 parts by weight) was added for reaction at 100° C. for 2 hours. Thus, an aqueous aminated epoxy resin was obtained.

(2) Preparation of Blocked Isocyanate Crosslinking Agent

Into 174 parts by weight of toluene diisocyanate (a 80/20 mixture of 2, 4 - toluene diisocyanate/2, 6 toluene diisocyanate: TDI) were gradually introduced dropwise 87 parts by weight of methyl ethyl ketone oxime, with the reaction temperature being kept lower than 50° C. by external cooling. A half-blocked isocyanate was thus obtained.

Then, 45 parts by weight of trimethyl propane and 0.05 parts by weight of dibutyl tin dilaurate were added, and reaction was carried out at 120° C. for 90 minutes. The resulting reaction product was diluted with 131 parts by weight of ethylene glycol monoethylether to obtain an aqueous blocked isocyanate.

The aminated epoxy resin (220 parts by weight) and 146 parts by weight of the blocked isocyanate were neutralized with 4.8 parts by weight of glacial acetic acid. The resultant mixture was then diluted with 342 parts by weight of deionized water, with the result that an emulsion with a nonvolatile content of about 36% was obtained.

Gel Fine Particle Dispersion (1) Preparation of Amine-Added Polybutadiene Resin Polybutadiene (B-2,000, made by Nippon Sekiyu K.K., number-average molecular weight: 2,000, 1, 2 bond: 65%) was epoxidized by using peracetic acid to produce an epoxidized polybutadiene having a 6.4% oxirane oxygen content.

One thousand grams of the epoxidized polybutadiene and 354 g of ethyl Cellosolve were charged into an autoclave, and then 62.1 g of dimethyl amine were added. Reaction was carried out at 150° C. for five hours. Unreacted amine was distilled away and thus an amine-added polybutadiene resin solution was produced.

The amine value of the obtained amine-added polybutadiene resin solution was 120 mmol/100 g (solid content). Nonvolatile content was 75%.

(2) Preparation of Gel Fine Particle Dispersion

| | |
|---|---|
| Amine-added polybutadiene resin | 100 wt parts (solid content 75%) |
| Tamanol 722 (*1) | 33.3 wt parts (solid content 25%) |
| Glacial acetic acid | 2.8 wt parts |
| Deionized water | 363.9 wt parts |

*1 a resol-type phenolic resin, made by Arakawa Kagaku Kogyo K.K.

To 100 parts by weight of the amine-added polybutadiene resin were added 33.3 parts by weight of Tamanol and 2.8 parts by weight of glacial acetic acid, and the mixture was well stirred. To the mixture were added 363.9 parts by weight of deionized water for emulsification.

A portion of the resulting emulsified solution was sampled, and same was added to 100 times as much hydrofuran as the sample quantity of emulsified solution, with the result that the emulsified solution was dissolved to be transparent.

Ethyl Cellosolve contained in the amine-added polybutadiene resin was removed, and then the emulsified solution obtained as above described was kept at 95° C. for 6 hours, being then cooled, with the result that a cationic gel fine particle dispersion was obtained.

The cationic gel fine particle dispersion was not dissolved to be transparent and became turbid in tetrahydrofuran. Then a tin plate was dipped in a gel fine particle dispersion having a 10% nonvolatile content. The tin plate was then air-dried and further dried at room temperature under reduced pressure. The presence of fine particles having a particle diameter of less than 100 nm was observed by means of an electron microscope.

Example 1

Preparation of Electrodeposition paint

| | |
|---|---|
| Pigment paste | 112 wt parts (solid content 61.6 wt parts) |
| Emulsion | 278 wt parts (solid content 100 wt parts) |
| Gel fine particle dispersed solution | 75 wt parts (solid content 18 wt parts) |
| Deionized water | 433 wt parts |

The foregoing ingredients were mixed and stirred together to prepare an electrodeposition paint.

The paint was used in effecting electrodeposition coating on a rotor core for a hard disk 20φ spindle motor (N (sample number)=10).

After electrodeposition coating, the electrodeposited film was placed in a drier for hydro-extraction and heated from a room temperature to 100° C. for about 2 minutes and from 100° to 160° C. for about 5 minutes, followed by baking at 160° C. for 25 minutes.

All the burrs were covered completely with the electrodeposition paint film and had the following characteristics.

Average film thickness: 50 μm,

Edge cover factor on rotor core surface: more than 70%, Depth of winding: less than 8 μm (where φ0.18 conductor wire is wound in four layers on an insulated rectangular metal pole having a section of 2.25 mm × 1.0 mm, under a tension of 150 g).

For comparison purposes, an insulating film was formed on same rotor core according to a conventional powder coating painting method. The results are shown in Table 1 below.

TABLE 1

| Process | Film thickness (μm) | Film thickness at edge (μm) | Edge cover factor (%) | Min. dielectric strength (V) | Max. dielectric strength (V) | Aver. dielectric strength (V) |
| --- | --- | --- | --- | --- | --- | --- |
| Powder painting (conventional) | 252 | 74 | 29.2 | 600 | 1500 | 900 |
| Electro-deposition coating (Invention) | 48 | 41 | 86.3 | 600 | 1500 | 900 |

*Hard disk spindle motor (N=10)

As is apparent from Table 1, use of the present invention enables thickness reduction to one fifth with respect to insulating films whose dielectric strength characteristics are of the same level as those of insulating films formed according to the invention.

Example 2

Electrodeposition coating and baking was carried out to form an electrodeposited film having an average film thickness of 50 μm, using same paint as in Example 1 and in same manner as in Example 1, except that the Example was applied to a rotor core for a 38φ spindle motor of floppy disk (N=10).

For comparison purposes, electrodeposition coating and baking was carried out to form an electrodeposited film having an average film thickness of 50 μm in a manner similar to Example 1, except for applying Power Top U Excell 200 (a paint for a general electric apparatus, made by Nippon Paint K. K.) on a rotor core which was subjected to blast treatment for removal of blanking burrs 3.

The two rotor cores thus obtained were made identical in specifications (coil diameter: 0.17 mm, number of turn: 100, winding tension: 150 g), and measurements were made with them as to minimum starting torque, maximum starting torque, and average starting torque. The results are shown in Table 2.

TABLE 2

| Blasting done or not | Min. Starting torque (gf.cm) | Max. Starting torque (gf.cm) | Aver. Starting torque (gf.cm) |
| --- | --- | --- | --- |
| Done (Conventional) | 160.7 | 178.9 | 168.2 |
| Not done (Invention) | 170.7 | 188.3 | 177.8 |

*38φ spindle motor (N=10)

As is clear from Table 2, even under same specifications, use of the present invention enables more than 5% improvement in torque generation.

For comparison, a conventional powder coating was applied to a rotor core for 38φ spindle motor which was not subjected to blast treatment for removal of blanking burrs 3 to form a film of 200 μm thickness.

Figure 5:
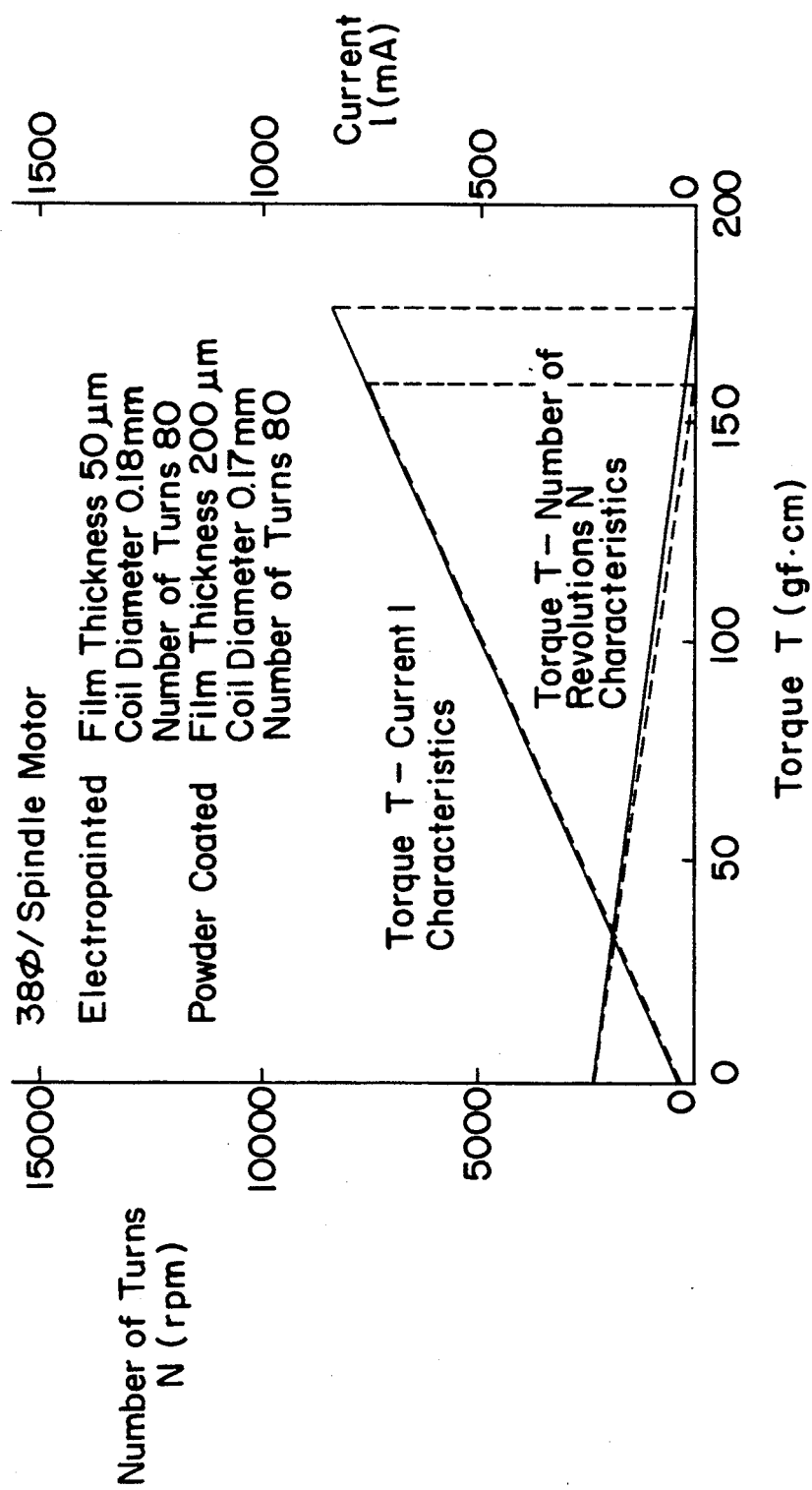
FIG. 5 is a characteristic comparison diagram with respect to a 38φ spindle motor.

The two rotor cores obtained as above shown were finished to same specifications: coil diameter 0.17 mm; number of turns 80. Respective motor cores obtained were incorporated into motors, and measurements were made with them as to relationship between torque, number of revolutions, and current. The results are shown in FIG. 5. In FIG. 5, solid lines represent the results with respect to the motor incorporating the rotor core to which the present invention was applied, while dotted lines represent the results with respect to the motor incorporating the rotor core to which the conventional powder coating process was applied.

As is clear from FIG. 5, under identical specifications, application of the invention resulted in improvement in starting torque. The reason for such improvement is that the reduction in the insulator thickness resulted in reduced distance between the windings and the rotor core 2 and reduced electromagnetic gap, which led to motor efficiency improvement.

Two rotor cores obtained as above described were subjected respectively to a winding process to have the same rotor thickness (a specified thickness). The respective rotor core could have the following different specifications: coil diameter 0.18 mm and number of turns 100 (the invention); and coil diameter 0.17 mm and number of turns 80 (conventional).

Figure 6:
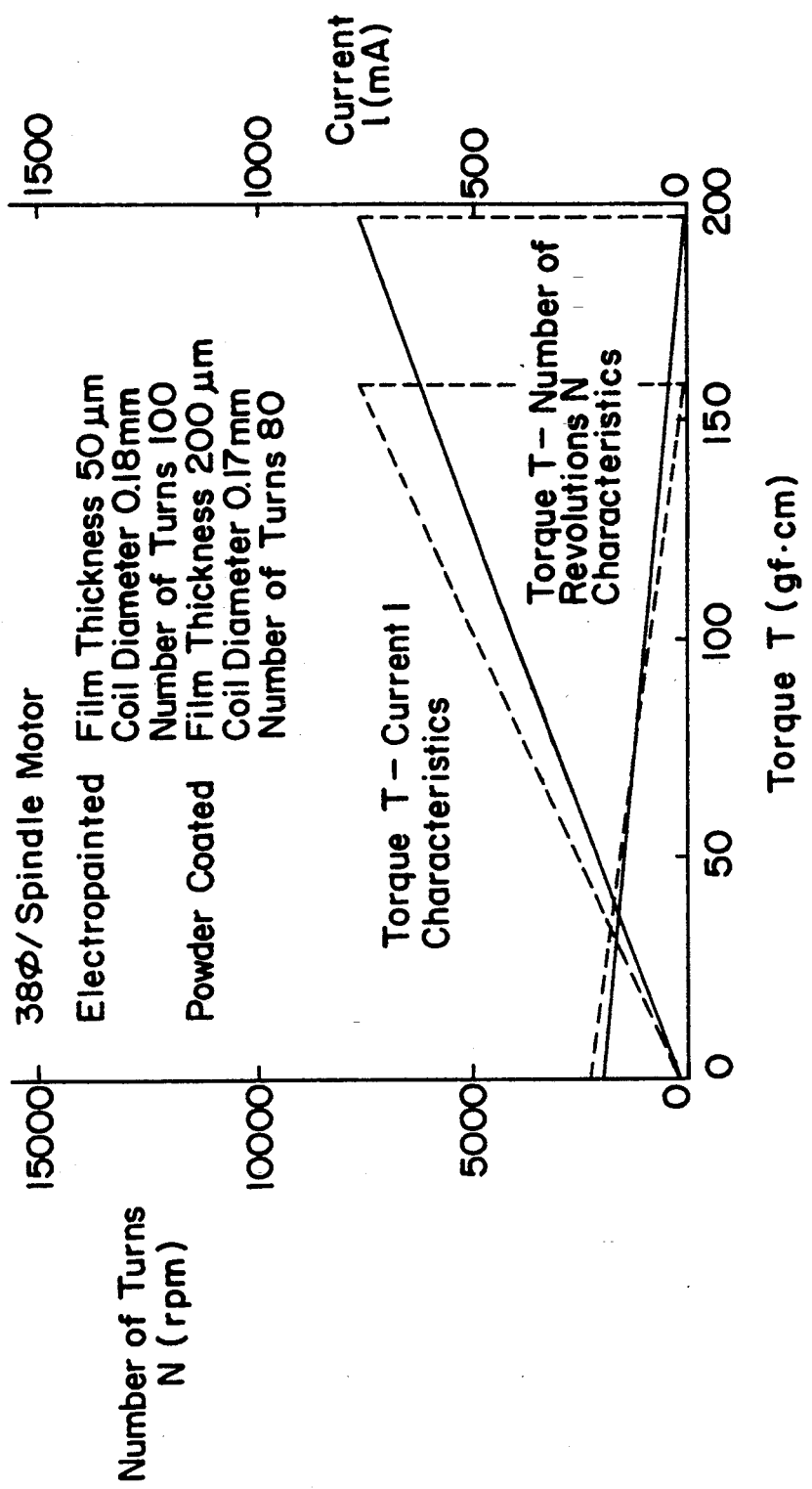
FIG. 6 is a characteristic comparison diagram with respect to a 38φ spindle motor.

Respective rotor cores obtained were incorporated into motors, and measurements were made with them as to the relationship between torque, number of revolutions, and current. The results are shown in FIG. 6. In FIG. 6, solid lines represent the results with respect to the motor incorporating the rotor core to which the present invention was applied, while dotted lines represent the results with respect to the motor incorporating the rotor core to which the conventional process was applied.

As is clear from FIG. 6, considerable improvement was observed in starting torque and generated torque T and current I, indicating improved motor performance and/or good electricity saving.

The thickness of the insulator formed between the windings and the rotor core 2 was reduced to 50 μm, from 200 μm under conventional powder coating process. Thus, considerable increase was obtained in the effective area of windings, which resulted in increased coil diameter and increased number of turns.

Example 3

In the same way as in Example 1, the invention was applied to a rotor core for autofocus spindle motor.

Figure 7:
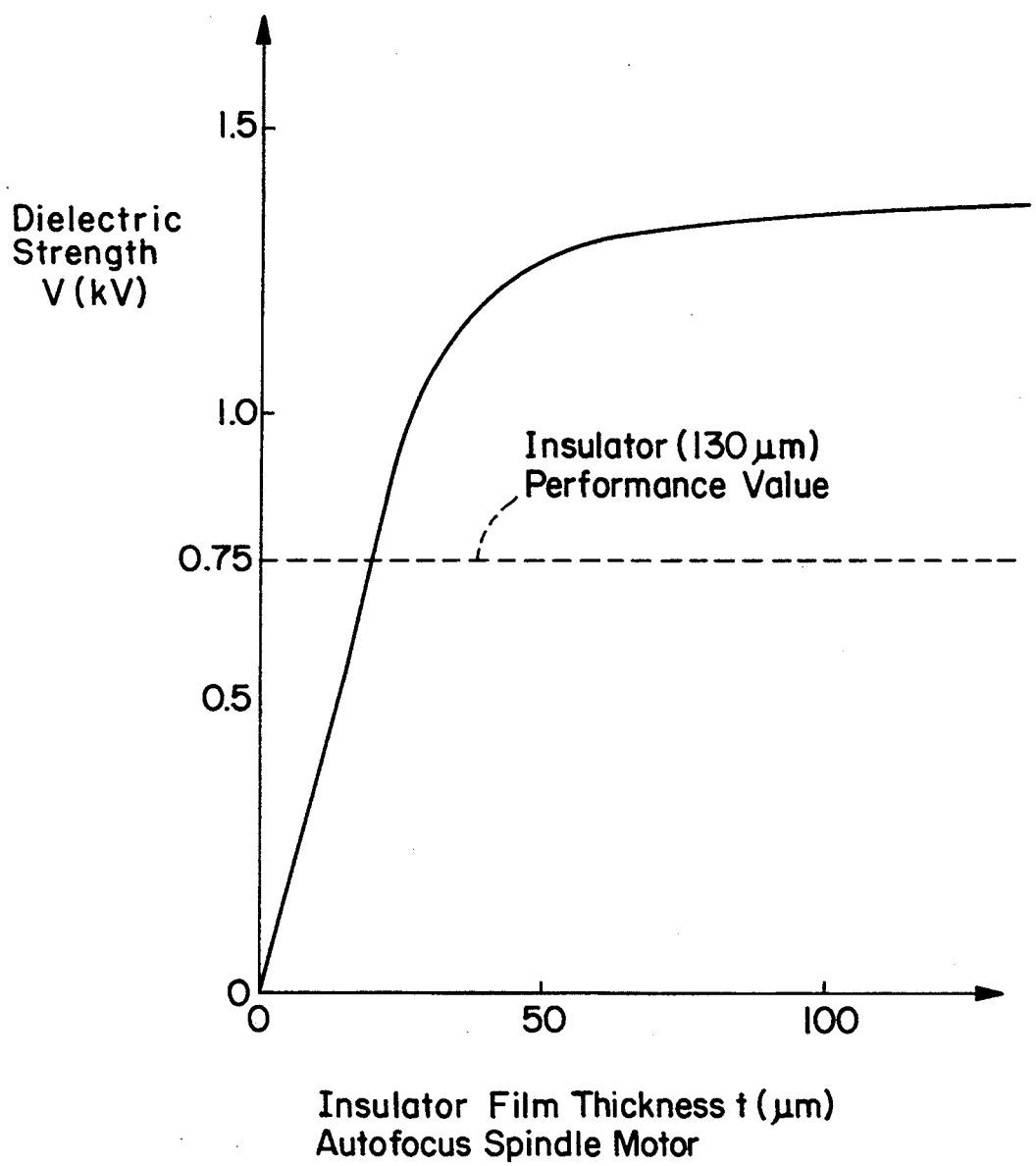
FIG. 7 is an insulation film thickness—dielectric strength (between winding and rotor core) characteristic curve with respect to an autofocus spindle motor.

The thickness of the insulator formed between the windings and the rotor core 2 was reduced to 20 μm, from 130 μm in the case of conventional insulator (POM, made by Polyplastics K. K.). This resulted in considerable increase in the effective area of windings.

Where the motor was designed to the same specifications as in the conventional case where a 130 μm thick insulator film was formed, the relationship between the insulator film thickness and dielectric strength characteristics is shown in FIG. 7. As is clear from FIG. 7, the windings—rotor core dielectric strength improved twofold. This tells that the invention can realize large power specifications with the existing motor size maintained as such and that the film with 20 μm thickness can give the same dielectric strength as that with 130 μm thickness.

Example 4

Electrodeposition coating was effected on the surface of a rotor core for a 38φ spindle motor of floppy disk to form a film having thickness of 50 μm in the same way as in Example 1, using an electrodeposition paint prepared according to a formulation comprising pigment paste, emulsion, gel fine particle dispersion, and deionized water, shown in Table 3 below.

The evaluations on relation between the composition and edge cover factors, voids, Erichsen value (mm), dielectric strength (V) and utility are shown in Table 3.

In Table 3, the voids are evaluated to be ranked as follows.

o: The surface of film was observed visually after baking. Pinholes were not found.

Δ: The surface of film was observed visually after baking. Pinholes were found but there is no problem in practical use.

x: The surface of film was observed visually after baking. A number of pinholes were found and it could not be put into practical use.

Utility was evaluated to be ranked as follows.

o: Dielectric strength was more than 800 V.

x: Dielectric strength was 800 V or less.

in which the dielectric strength is a mean value hereinafter.

TABLE 3

| | formulation | | edge-covering ratio (%) | voids | Erichsen value (mm) | dielectric strength (V) | utility |
| --- | --- | --- | --- | --- | --- | --- | --- |
| | pbw | solid (pbw) | | | | | |
| pigment paste | 167 | 92 | 80.6 | X | 1.71 | 400 | X |
| emulsion | 278 | 100 | | | | | |
| gel dispersion[1] | — | — | | | | | |
| deionized water | 516 | — | | | | | |
| pigment paste | 164 | 90 | 96.1 | Δ | 4.10 | 810 | O |
| emulsion | 278 | 100 | | | | | |
| gel dispersion | 75 | 18 | | | | | |
| deionized water | 523 | — | | | | | |
| pigment paste | 103 | 56.5 | 35.7 | O | 4.72 | 600 | X |
| emulsion | 278 | 100 | | | | | |
| gel dispersion | 34.2 | 8.2 | | | | | |
| deionized water | 409 | — | | | | | |
| pigment paste | 112 | 61.6 | 44.2 | O | 4.70 | 680 | X |
| emulsion | 278 | 100 | | | | | |
| gel dispersion | 37.5 | 9 | | | | | |
| deionized water | 426 | — | | | | | |
| pigment paste | 112 | 61.6 | 70.8 | O | 4.95 | 1270 | O |
| emulsion | 278 | 100 | | | | | |
| gel dispersion | 75 | 18 | | | | | |
| deionized water | 433 | — | | | | | |
| pigment paste | 112 | 61.6 | 90.1 | O | 7.39 | 1290 | O |
| emulsion | 278 | 100 | | | | | |
| gel dispersion | 150 | 36 | | | | | |
| deionized water | 448 | — | | | | | |
| pigment paste | 112 | 61.6 | 116 | O~Δ | 8.25 | 1400 | O |
| emulsion | 278 | 100 | | | | | |
| gel dispersion | 225 | 54 | | | | | |
| deionized water | 463 | — | | | | | |
| pigment paste | 112 | 61.6 | 120 | Δ | 8.71 | 1300 | O |
| emulsion | 278 | 100 | | | | | |
| gel dispersion | 300 | 72 | | | | | |
| deionized water | 478 | — | | | | | |
| pigment paste | 112 | 61.6 | 121 | X | 8.79 | 800 | X |
| emulsion | 278 | 100 | | | | | |
| gel dispersion | 375 | 90 | | | | | |
| deionized water | 493 | — | | | | | |
| pigment paste | 91 | 50 | 63.7 | O | 5.35 | 1020 | O |
| emulsion | 278 | 100 | | | | | |
| gel dispersion | 75 | 18 | | | | | |
| deionized water | 396 | — | | | | | |

38φ spindle motor (N=10)
[1] gel dispersion: gel fine particle dispersion

It may be readily understood that the edge covering ratio and dielectric strength between the windings—rotor core 2 improve in proportion to the increase of content of the gel fine particle dispersion.

It can be found that the number of voids increases in the film in proportion to the increase of content of the gel fine particle dispersion. This is because the increase of content of the gel fine particle dispersion causes the increase of viscosity of melted film, resulting in insufficient removal of hydrogen gas, a solvent and water in the film before baking. The more the voids, the more porous the deposited film is. As a result a strength of the deposited film is lowered, resulting in the reduction of the dielectric strength between the windings and the rotor core. When the content of pigment paste is too high, the coating film becomes fragile, Erichsen value becomes small and voids increase. When the content is too small, the edge-covering characteristics deteriorate.

Example 5

An electrodeposition coating was applied to the surface of a rotor core for 38φ spindle motor (N=10) using the same paint as in Example 1 to form a deposited film having 50 μm thickness in a manner similar to Example 1, except that a baking process was carried out at a temperature shown in Table 4 below. The ranking in evaluation in Table 4 is the same as that in Table 3.

TABLE 4

| baking temp. (°C.) | edge-covering ratio (%) | Erichsen value (mm) | winding depth (μm) | voids | dielectric strength (V) | utility |
|---|---|---|---|---|---|---|
| 130 | 83.7 | 5.83 | <22 | ○ | 650 | X |
| 145 | 79.3 | 5.40 | <10 | ○ | 1200 | ○ |
| 160 | 75.1 | 4.95 | <8 | ○ | 1300 | ○ |
| 185 | 61.7 | 4.41 | <7 | Δ | 1000 | ○ |
| 200 | 48.2 | 3.91 | <5 | X | 700 | X |

It can be understood that the increase of the baking temperature causes the change of characteristics of the electrodeposited film as follows.

(1) Edge-covering ratio decreases.
(2) The reduction of Erichsen value causes the embrittlement of the film.
(3) The generation of voids increases.
(4) The strength of the film is improved as winding depth reduces.

Example 6

Figure 4B:
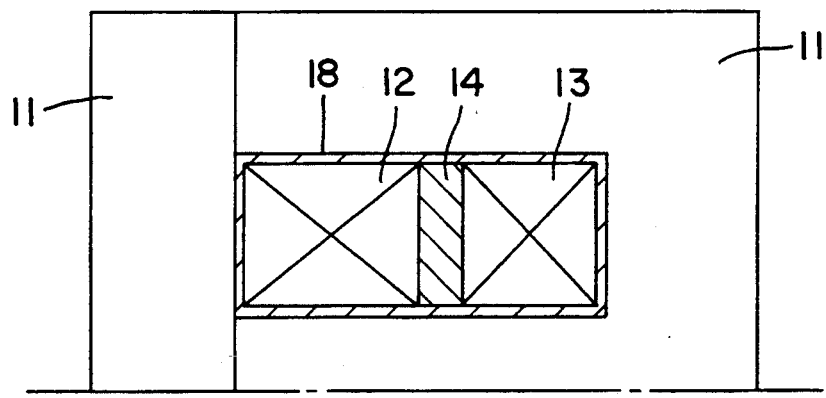
FIG. 4(b) is a sectional view of a transformer core showing another embodiment of the invention.

The invention was applied to an 1 W transformer, as one example of electronic part, as described below with reference to FIG. 4(b). Reference Number 18 designates a 50 μm thick electrodeposited insulating film applied to core 11. As FIG. 5(b) shows, insulating case 15, and insulating tapes 16, 17 which are conventionally used can be dispensed with. Bobbin 14 can be simplified in constitution such that it only serves to provide insulation between primary winding 12 and secondary winding 13.

This resulted in considerable increase in the effective area of the windings. Accordingly, the winding space factor relative to slot portion showed a significant increase from 52.9% (conventional) to 85.2% (present invention). This tells that according to the invention, considerable weight, thickness and size reduction, and/or capacity increase can be achieved with respect to transformers.

What is claimed is:

1. A film forming method comprising:
    electrodepositing on an electronic part metal surface, having burrs thereupon, an electrodeposition paint comprising:
    (A) an emulsion containing 60-80 parts by weight, in terms of solid content, of an amino group-containing polymer which is a reaction product of a bis-phenol A residue-containing epoxy resin having a number-average molecular weight of 1,000 to 3,000 and more than one epoxy group per molecule on average or a derivative thereof and a monovalent secondary amine, and 20-40 parts by weight, in terms of solid content, of a blocked isocyanate crosslinking agent,
    (B) a gel fine particle dispersion containing 20-50 parts by weight, in terms of solid content, of a methylophenolic compound having a number-average molecular weight of 200-1,000 and 50 to 80 parts by weight, in terms of solid content, of an amine-added polybutadiene resin having a number-average molecular weight of 1,000 to 3,000, and
    (C) a pigment paste containing 50-70 parts by weight of a pigment in terms of solid content, and 5-15 parts by weight, in terms of solid content, of a resin for dispersing a pigment, a content ratio in terms of solid content of (A)/(B)/(C) being 1/0.18-0.72/0-.5-0.9, and baking the resulting electrodeposited film,
    thereby forming an insulating film having an average thickness of 20 to 100 μm, an edge covering factor of more than 50% and a surface roughness of orange peeling-like irregularities of 5-20 μm wherein said film prevents electrical shortcircuiting of the electronic part metal surface.

2. The film forming method of claim 1, wherein the electronic part is a rotor core for a motor.

3. The film forming method of claim 1, wherein the electronic part is a transformer core.

4. The film forming method of one of claim 1 to claim 4, wherein the baking process is carried out at a temperature within the range between 135° C. and 195° C. for 20 to 40 minutes.

5. The film-forming method according to claim 1, wherein the insulting film is the only film layer formed on the electronic part metal surface.

* * * * *